United States Patent Office 3,281,353
Patented Oct. 25, 1966

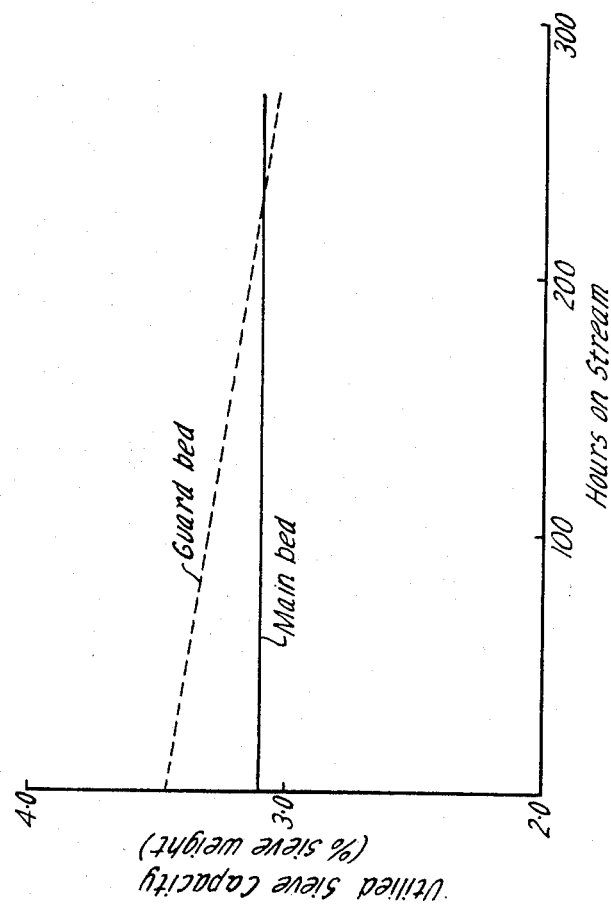

3,281,353
SEPARATION PROCESSES USING MOLECULAR SIEVES
Alan Arthur Yeo and Clive Leonard Hicks, Sunbury-on-Thames, England, assignors to The British Petroleum Company Limited, London, England, a British joint-stock corporation
Filed Apr. 16, 1963, Ser. No. 272,535
Claims priority, application Great Britain, Apr. 16, 1962, 14,601/62
8 Claims. (Cl. 208—310)

This invention relates to separation processes using molecular sieves and particularly to processes for the separation of straight-chain hydrocarbons from petroleum fractions boiling within the gas-oil range or above.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It has previously been proposed to treat petroleum fractions ranging from gasoline to gas-oils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered as a product if desired. For example, a process suitable for separating normal paraffins from petroleum fractions boiling $C_{10}$–$C_{20}$ range is described in our co-pending application No. 3,965/61.

According to the present invention, in a process for separating straight-chain hydrocarbons from petroleum fractions boiling within the $C_{10}$–$C_{20}$ range or higher by means of a 5 A. molecular sieve, using successive absorption and desorption stages, with or without an intervening purge stage, the feedstock is contacted in a pretreatment zone with a molecular sieve having the same pore diameter as the sieve used in the main separation process, the temperature in the pretreatment zone being at least as high as the temperature in the absorption stage of the main separation process and sufficiently high to maintain vapour phase operation in the pretreatment zone.

By pretreating the feedstock according to the present invention, the capacity decay rate of the molecular sieve bed or beds used in the main separation process can be reduced and thus the activity of the main sieve beds maintained for long periods. The pretreatment sieve may be small compared with the main sieve beds and its cost correspondingly less. For example, the size of the pretreatment bed may be from 1 to 1/1000, preferably 1/2 to 1/10, that of the main sieve beds. The minimum size of pretreatment bed will depend upon the rate of sieve deactivation under the operating conditions of the process. However, the guard bed may be allowed to become deactivated to a much greater extent before regeneration becomes necessary than the main absorbent beds. Deactivation of the main beds, even to a relatively small extent, is reflected by a drop in yield of product. Deactivation of the guard bed, however, does not affect the product yield and it only becomes necessary to regenerate the guard bed when deactivation has reached the stage where the deactivating components of the feedstock are no longer being retained in the guard bed. For example, regeneration of the main beds may be necessary when the sieve has been deactivated by 15% whereas deactivation of the guard bed may be allowed to proceed to about 75% deactivation before regeneration. The pretreatment bed is thus deactivated much more rapidly than the main beds and may be regenerated by burning off the deactivating material in the conventional manner. If desired, two pretreatment zones may be employed so that one may be substituted while the other is being regenerated. Alternatively, a by-pass line may be provided round the guard bed so that while the guard bed is being regenerated the feedstock may flow directly into the absorption zone. Provided the period for regenerating the guard zone is short, e.g. about 50 hours, no appreciable deactivation of the main sieve beds will occur by passing feedstock directly to them during this period; if, however, the period required to regenerate the sieve bed is fairly long, e.g. about 250 hours or more, it will be preferable to provide two guard zones.

It has been observed that, under equilibrium conditions, the affinity of n-paraffins for molecular sieves increases with increasing molecular weight. It has also been found that under vapour phase conditions the higher-boiling n-paraffins are preferentially absorbed even when equilibrium conditions are not approached. Petroleum fractions generally contain small quantities of hydrocarbons which boil outside the nominal boiling range of the fraction, for example up to 0.1% of $C_{25}$ hydrocarbons may be present in a nominal $C_{10}$–$C_{20}$ range gas-oil. It is believed that the capacity decay rate is at least partially due to the accumulation of high molecular weight hydrocarbons in the sieve pores, these high-boiling hydrocarbons not being removed during the normal desorption stage. By operating a pretreatment zone according to the present invention, build-up of high-boiling hydrocarbons takes place in the pretreatment sieve bed rather than in the main separation sieve beds.

The problem of sieve deactivation due to high molecular weight hydrocarbon build-up is encountered mainly during the treatment of gas-oil fractions and higher. During the treatment of lower-boiling fractions boiling in the naphtha-kerosine ranges, although hydrocarbons boiling outside the nominal range of the fraction will be present, they are sufficiently low boiling to be desorbed during the normal desorption stage and do not, therefore, tend to accumulate in the sieve.

Suitable absorption temperatures and pressure for treating gas-oil fractions lie, respectively, within the range 300–450° C. preferably 350–390° C. and 0–300 p.s.i.g., preferably 100–150 p.s.i.g. The conditions of the pretreatment zone of the present invention may lie within the same ranges and are preferably the same as the conditions of the absorption stage In this way the conditions obtained in the main absorption bed are reproduced in the guard zone so that, in addition to absorption of high boiling deactivating hydrocarbons taking place in the guard zone, deactivation due to other causes such as cracking or adsorption of polar materials will tend to take place in the guard zone rather than the main absorbent beds.

The process of the present invention may be used in any molecular sieve separation process in which deactivation is accelerated by the presence of high molecular weight hydrocarbons in the feedstock. It is particularly suitable for use in the process described in our co-pending U.K. patent application No. 3,965/61. This process is isothermal and comprises contacting the $C_{10}$–$C_{20}$ fraction with a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using either n-pentane or n-butane as desorbing medium, all three stages being in the vapour phase, the pressure in the desorption stage being equal to, or greater than, the pressure in the absorption stage, and recovering the desorbed straight-chain hydrocarbons in a purity of at least 95% weight.

In a process of the type described above, the beds of sieve employed tend to be gradually deactivated until it becomes necessary to regenerate them. Regeneration is carried out periodically in a conventional manner by contacting the sieve with an oxygen-containing gas under controlled conditions to burn off the deactivating material. To avoid shutting down the whole process in order to regenerate a bed of sieve, a spare "swing" absorber containing a bed of sieve may be provided so that when it is necessary to regenerate a bed of sieve, a spare bed is available to be brought into operation in its place. Preferably the process has at least three beds of sieve on stream at any given time, four beds being particularly preferred, so that at any given time one bed is absorbing, one bed is being purged and one or two being desorbed. When operating such a swing absorber process it is clearly necessary that the deactivation rate of the beds should be sufficiently low to enable them to continue on stream for a period at least four times as long as that taken to regenerate a bed and the present invention may assist in reducing the deactivation rate to this level. Again, the use of a guard bed may reduce the deactivation rate to a point where a swing absorber becomes unnecessary, regeneration, when required, being effected at extended intervals by taking the whole plant off stream and regenerating all the beds together.

The invention is illustrated by means of the following example:

Example

A 220–340° C. boiling range gas oil, hydrofined to 0.01% wt. sulphur, was contacted with a bed of 123 g. of 5 A. sieve at 380° C. and atmospheric pressure. Effluent from this bed was condensed under conditions where air was excluded by a nitrogen flow and then passed over a second bed of 123 g. of 5 A. sieve under identical conditions of temperature and pressure. In both cases the liquid hourly space velocity of the gas-oil relative to the total absorber volume was 0.25.

At periodic intervals the flow of feedstock was interrupted and each bed was subjected to a standard desorption technique using (a) n-heptane at 1.0 LHSV for 1 hour.
(b) $N_2$ at 120 GHSV for 1 hour.

The flow of gas-oil was then resumed and quantity of n-paraffins reabsorbed by the sieve, expressed as a percentage of sieve weight, was determined by a refractive index method. This procedure was continued for a period of 270 hours.

Capacity decay rates for the two beds are shown in the accompanying drawing. The decay rate of the first (pretreatment) bed corresponded to that observed on main absorption beds when no pretreatment bed was employed. No decay in the second (main) bed was observed over the 270 hour period. This result was confirmed in a second experiment carried out under the same conditions.

We claim:
1. A process for the separation of straight-chain hydrocarbons from petroleum fractions boiling at least within the range $C_{10}$–$C_{20}$ by means of a 5 A. molecular sieve using successive absorption and desorption stages comprising contacting the feedstock in a pretreatment stage with a 5 A. molecular sieve at a temperature in the range 300–450° C. and at least as high as that temperature to be employed in the subsequent absorption stage of the process and sufficiently high to maintain vapor phase operation in said pretreatment zone, contacting the pretreated feedstock at an elevated temperature with a 5 A. molecular sieve in an absorption stage, subjecting the molecular sieve to a desorption stage at an elevated temperature and in the vapor phase to obtain straight-chain hydrocarbons, and recovering the desorbed straight-chain hydrocarbons.

2. A process as claimed in claim 1 wherein the temperature of the pretreatment zone is within the range 350–390° C.

3. A process as claimed in claim 1 wherein the pretreatment zone is operated at the same temperature as the absorption stage.

4. A process as claimed in claim 1 wherein the pretreatment zone is operated at a pressure within the range 0–300 p.s.i.g.

5. A process as claimed in claim 4 wherein the pressure of the pretreatment zone is within the range 100–150 p.s.i.g.

6. A process as claimed in claim 3 wherein the pretreatment zone is operated at the same pressure as the absorption stage.

7. A process as claimed in claim 1 wherein the size of the pretreatment zone is from 1 to $\frac{1}{1000}$ that of the main absorbent beds.

8. A process as claimed in claim 1 wherein the size of the pretreatment zone is from $\frac{1}{2}$–$\frac{1}{10}$ that of the main absorbent beds.

References Cited by the Examiner

UNITED STATES PATENTS 2,899,474   8/1959   Ricards _____ 208—310

ALPHONSO D. SULLIVAN, *Primary Examiner.*